United States Patent Office 3,209,041
Patented Sept. 28, 1965

3,209,041
PREPARATION OF FLUORENE DERIVATIVES
Henry J. Peterson, Wilmington, Del., assignor to Sun Oil Company, Philadelphia, Pa., a corporation of New Jersey
No Drawing. Filed Nov. 21, 1962, Ser. No. 239,342
14 Claims. (Cl. 260—668)

This invention relates to a method for preparing fluorene derivatives and more particularly to a method for preparing fluorene derivatives wherein the starting material is a substituted alkenyl biphenyl.

Fluorene and fluorene derivatives find particular utility in the preparation of resinous materials, dyestuffs, and as insecticides. Fluorene and fluorene derivatives occur in coal tar. They are present, however, usually in amounts less than 2%. Fluorene and fluorene derivatives have also been prepared synthetically by reducing diphenylene ketones with zinc.

A method has now been found whereby fluorene and fluorene derivatives may be prepared in essentially quantitative yields from substituted alkenyl biphenyls.

Briefly stated, the process of this invention comprises reacting a substituted alkenyl biphenyl in the presence of hydrogen fluoride or a mixture of hydrogen fluoride and boron trifluoride and thereafter recovering the fluorene derivative.

The substituted alkenyl biphenyl starting materials to be used in this invention have the following general formula:

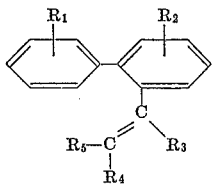

wherein $R_1$, $R_2$, $R_3$, $R_4$ and $R_5$ are selected from the group consisting of hydrogen and alkyl radicals containing from 1 to 12 carbon atoms.

These materials can be prepared by any of several well known methods such as those described in J.A.C.S., 70, 1916 (1948), and J.A.C.S., 72, 3078 (1950). Examples of suitable alkenyl biphenyls which can be used as starting materials in the instant invention include

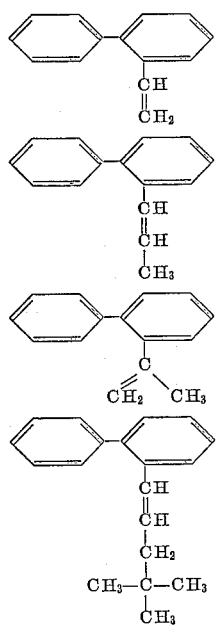

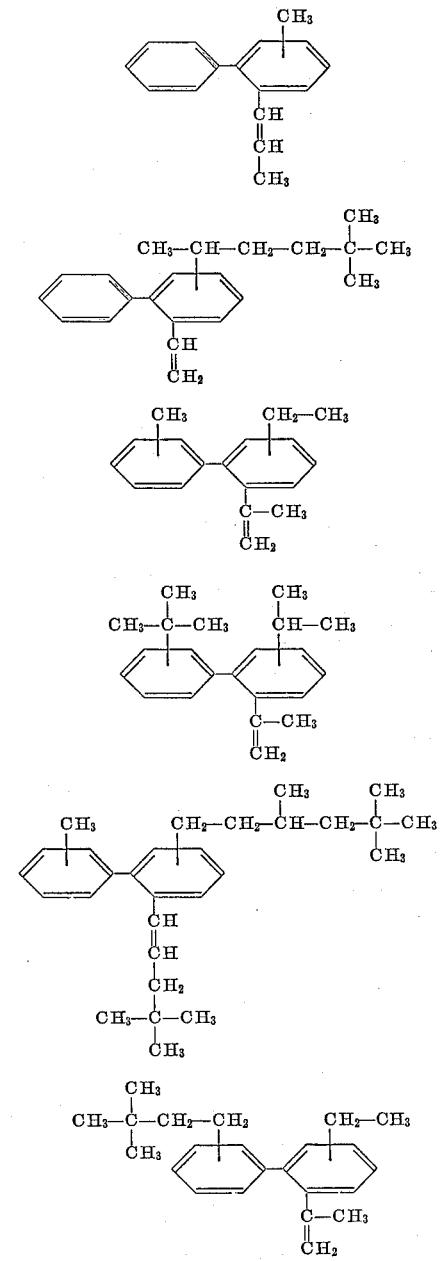

It should be noted that for an alkenyl biphenyl to be operable in the instant invention it must contain a reactive nucleus having the formula

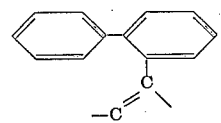

The substituents $R_1$, $R_2$, $R_3$, $R_4$ and $R_5$ as defined above do not control the reactivity of this important nucleus and hence are not to be considered as constituting a critical aspect of the present invention except as to the limitation set forth above.

According to this invention the substituted alkenyl biphenyl is reacted in the presence of either hydrogen fluoride, or a mixture of hydrogen fluoride and boron trifluoride. The amount of hydrogen fluoride to be used can range between 0.001 to 100 moles of hydrogen fluoride per mole of substituted alkenyl biphenyl. It is preferred that the molar ratio of hydrogen fluoride to substituted alkenyl biphenyl range between 75:1 and 100:1.

The amount of boron trifluoride to be used can range between 0.001 and 1 mole of boron trifluoride per mole of hydrogen fluoride used. It is preferred that the molar ratio of boron trifluoride to hydrogen fluoride range between 0.001 and 0.25:1.

The temperature to which the reaction mixture is contacted is in the range of from room temperature, i.e., 20° C., to 100° C. or higher more preferably from 50° C. to 75° C.

The time that the reaction mixture is contacted at the proper temperature can vary over wide limits. It has been found that substantial amounts of desired products are formed when the reaction mixture is contacted at the proper temperature for as little as 10 minutes. On the other hand, no degradation products are formed if the reaction time is as long as 5 hours. It is preferred that the time of reaction be between 15 minutes and 3 hours.

In the preparation of fluorene derivatives according to the process of this invention the substituted alkenyl biphenyl can be reacted either in the presence or absence of a suitable solvent material. Examples of solvents which are useful in the instant process include chloroform and benzene.

When preparing fluorene derivatives according to the process of this invention utilizing either hydrogen fluoride or a mixture of hydrogen fluoride and boron trifluoride, it is preferred that the reaction be conducted under slightly superatmospheric pressures.

The following example further illustrates the instant invention:

*Example*

In 25 ml. of benzene there were dissolved 2.0 g. of o-isopropenylbiphenyl prepared in accordance with the method set forth in J.A.C.S., 72, 3078 (1950). The resulting solution was charged to a Hoke bomb and 20 g. of hydrogen fluoride and 0.0025 mole of boron trifluoride were introduced therein. The reaction mixture was heated at 70° C. for 3 hours. At the end of the reaction time the reaction mixture was neutralized with aqueous 5% sodium carbonate. The benzene phase was separated from the aqueous phase and evaporated to dryness. There was recovered 1.78 g. (representing an 89% yield of theory) of a light yellow crystalline material which was identified by nuclear magnetic resonance, infrared and ultraviolet spectra and melting point (found 69.5–70° C., literature 71° C.) as 9,9-dimethylfluorene.

When other compounds of the class described above are substituted for o-isopropenyl biphenyl, substantially similar results are obtained.

I claim:

1. Method of preparing fluorene derivatives having the general formula

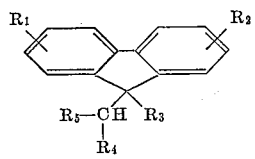

wherein $R_1$, $R_2$, $R_3$, $R_4$ and $R_5$ are selected from the group consisting of hydrogen and alkyl radicals containing from 1 to 12 carbon atoms which comprises reacting an alkenyl biphenyl having the formula

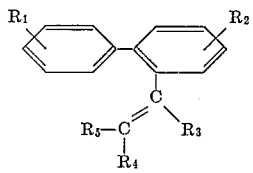

wherein $R_1$, $R_2$, $R_3$, $R_4$ and $R_5$ are selected from the group consisting of hydrogen and alkyl radicals containing from 1 to 12 carbon atoms in the presence of hydrogen fluoride and thereafter recovering said fluorene derivative.

2. Method in accordance with claim 1 wherein the reaction is conducted in the presence of a mixture of hydrogen fluoride and boron trifluoride.

3. Method in accordance with claim 2 wherein the temperature is in the range of from 20° C. to 100° C.

4. Method in accordance with claim 2 wherein the molar ratio of hydrogen fluoride to alkenyl biphenyl is in the range of from 0.001:1 to 100:1 and the molar ratio of boron trifluoride to hydrogen fluoride is in the range of from 0.001:1 to 1:1.

5. Method in accordance with claim 1 wherein the temperature is in the range of from 20° C. to 100° C.

6. Method in accordance with claim 1 wherein the molar ratio of hydrogen fluoride to alkenyl biphenyl is in the range of from 0.001:1 to 100:1.

7. Method for preparing 9,9-dimethylfluorene which comprises reacting o-isopropenylbiphenyl in the presence of hydrogen fluoride and thereafter recovering 9,9-dimethylfluorene.

8. Method in accordance with claim 7 wherein the reaction is conducted in the presence of a mixture of hydrogen fluoride and boron trifluoride.

9. Method in accordance with claim 8 wherein the temperature is in the range of from 20° C. to 100° C.

10. Method in accordance with claim 8 wherein the molar ratio of hydrogen fluoride to o-isopropenylbiphenyl is in the range of from 0.001:1 to 100:1 and the molar ratio of boron trifluoride to hydrogen fluoride is in the range of from 0.001:1 to 1:1.

11. Method in accordance with claim 7 wherein the temperature is in the range of from 20° C. to 100° C.

12. Method in accordance with claim 7 wherein the molar ratio of hydrogen fluoride to o-isopropenylbiphenyl is in the range of from 0.001:1 to 100:1.

13. Method for preparing 9,9-dimethylfluorene which comprises heating o-isopropenylbiphenyl at a temperature in the range of from 50° C. to 75° C. in the presence of 75 to 100 moles of hydrogen fluoride per mole of o-isopropenylbiphenyl and thereafter recovering 9,9-dimethylfluorene.

14. Method for preparing 9,9-dimethylfluorene which comprises heating o-isopropenylbiphenyl at a temperature in the range of from 50° C. to 75° C. in the presence of 75 to 100 moles of hydrogen fluoride per mole of o-isopropenylbiphenyl and 0.001 mole to one mole of boron trifluoride per mole of hydrogen fluoride and thereafter recovering 9,9-dimethylfluorene.

References Cited by the Examiner

UNITED STATES PATENTS 3,078,319    2/63    Wood _____ 260—668
3,091,652    5/63    Soderquist et al. _____ 260—668

ALPHONSO D. SULLIVAN, *Primary Examiner.*